United States Patent [19]

Haas et al.

[11] 3,812,890

[45] May 28, 1974

[54] DEVICE FOR TRANSMITTING PREDETERMINED VOLUMES OF LIQUID FROM ONE CONTAINER TO ANOTHER CONTAINER

[75] Inventors: Werner Haas, Uttenreuth; Klaus-Steffen Isensee, Erlangen, both of Germany

[73] Assignee: Siemens Aktiengesellschaft, Erlangen, Germany

[22] Filed: July 25, 1972

[21] Appl. No.: 274,901

[30] Foreign Application Priority Data
Aug. 5, 1971  Germany.......................... 2139258

[52] U.S. Cl...................... 141/94, 141/192, 222/70
[51] Int. Cl. ........................ B67d 5/54, G01n 21/26
[58] Field of Search............. 141/94, 130, 140–143, 141/153, 192, 156–162; 222/52, 70; 73/421 B; 250/218

[56] References Cited
UNITED STATES PATENTS

| | | | |
|---|---|---|---|
| 3,015,957 | 1/1962 | Paulson............................ | 73/421 B |
| 3,163,176 | 12/1964 | Darling........................... | 250/218 X |
| 3,596,673 | 8/1971 | Laucournet..................... | 250/218 X |
| 3,700,904 | 10/1972 | Stobble et al..................... | 250/218 |

*Primary Examiner*—Billy J. Wilhite
*Assistant Examiner*—Philip R. Coe
*Attorney, Agent, or Firm*—V. Alexander Scher; Richards and Grier

[57] ABSTRACT

A device for transmitting predetermined volumes of liquid from one container to another container consists of a pipe leading from the first container to the second container and immersed into the liquid in the first container, means sealing the first container, a pressure transmitting tube introduced into the first container for producing pressure means pressing the liquid through the pipe and means measuring a predetermined liquid volume. The invention is particularly characterized in that there is a substantially constant super pressure in the first container and there are two signalling devices spaced from each other and located in the path of the flowing liquid. When the liquid front passes them they transmit a signal to a calculator which determines from these signals the volume of liquid passing through the pipe per time unit. Closure means for the liquid are connected to the calculator. They receive a closing signal formed by the incoming signals after the passing of time required for the transmission of desired liquid volume set at the calculator.

4 Claims, 1 Drawing Figure

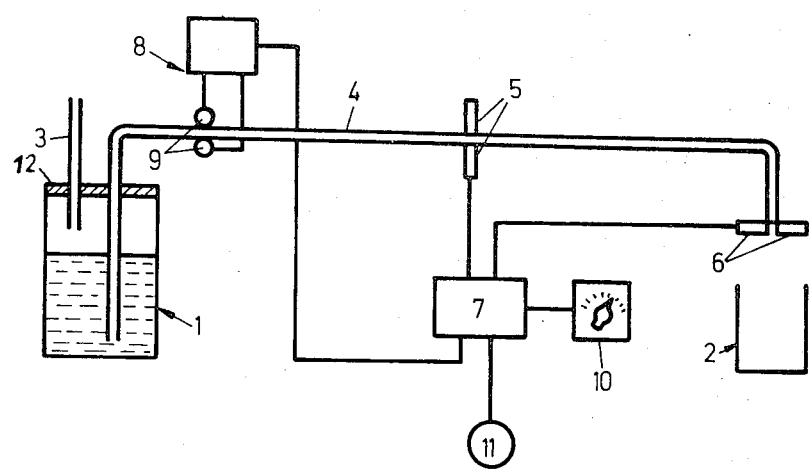

DEVICE FOR TRANSMITTING PREDETERMINED VOLUMES OF LIQUID FROM ONE CONTAINER TO ANOTHER CONTAINER

This invention relates to a device for transmitting predetermined volumes of liquid from one container to another container consisting of a pipe leading from the first container to the second container and having an end immersed into the liquid in the first container, means sealing the first container, a pressure transmitting tube introduced into the first container for producing pressure means pressing the liquid through the pipe and means for measuring a predetermined liquid volume.

A device of this type is disclosed in FIG. 22 of the German Pat. specification No. 1,648,865. According to this known device means for measuring a predetermined liquid volume consist of a single electrical signal giver located in the path of the liquid and producing a signal when it is reached by the liquid front for ending the pressure pushing the liquid out of the first container and for emptying the pipe filled with the liquid. When the pipe is emptied in the second container the procedure is repeated as many times as it is desired to transmit the specific liquid amount from the first container to the second container.

A drawback of this known device is that a predetermined liquid volume can be transmitted only with very little precision, since only the liquid volume contained in a predetermined part of the pipe or a multiple thereof can be transmitted.

An object of the present invention is to improve devices of the described type by making possible a transmission of a predetermined liquid volume with greater precision than was possible heretofore.

Other objects of the present invention will become apparent in the course of the following specification.

In the accomplishment of the objectives of the present invention it was found desirable to provide for use with a substantially constant super pressure in the first container two spaced signalling devices in the path of the flowing liquid. When the liquid front passes them, they transmit a signal to a calculator which determines from these signals the volume of liquid passing through the pipe per time unit. Means closing the flow of liquid are connected with the calculator. They receive from the calculator a closing signal formed from the incoming signals after the passage of time, required for the flow of the specific liquid volume.

In accordance with the device of the present invention the inner pipe volume located between the two signalling devices is constant and fixedly indicated in the calculator, so that the calculator can determine the liquid volume transmitted per time unit from the speed with which the liquid front passes the two signalling devices. The precision with which the passing of liquid in the device of the present invention takes place, depends upon the precision with which the calculator determines the liquid volume transmitted per time unit and produces the closing signal and upon pressure tolerances in the first container. Due to the use of electronic parts in the calculator, this precision is very good.

The invention will appear more clearly from the following detailed description when taken in connection with the accompanying drawing the sole FIGURE of which is a diagram partly in section illustrating a device of the present invention.

The embodiment shown in the drawing is a device by means of which predetermined liquid volumes are to be transmitted from a first container 1 to a second container 2. The first container 1 is pressure tightly sealed by a cover 12. Through the cover 12 extends a tube 3 for the pressure means and a pipe 4 one end of which is immersed into the liquid located in the container 1, while its other end is located over the container 2. A first signalling device 5 and a second signalling device 6 are located in the path of flow of the liquid. Each of the signalling devices 5 and 6 consists of a sender and a receiver, for example, of the type of a light source and a photosource. The signalling device 6 is located at the end of the pipe extending over the container 2 and is actuated by the liquid front emerging out of this end of the pipe. The signaling devices 5 and 6 transmit a signal to a calculator 7 whenever the liquid front passes by them. The calculator 7 operates a closure device 8 containing two clamps 9 for clamping the pipe 4 consisting of an elastic hose. A setting device 10 used to set the desired liquid volume to be transmitted from the container 1 to the container 2, is connected to the calculator 7.

The calculator 7 determines the liquid volume transmitted per time unit from the container 1 to the container 2 from the time existing between two signals of the signalling devices 5 and 6 and from the volume located between the two signalling devices 5 and 6. When the time runs out during which the liquid volume set by the setting device 10 has been transmitted, the calculator 7 transmits a closure signal to the closure device 8 which moves the two clamps 9 toward each other and interrupts the flow of liquid.

There can be any desired amount of super pressure in the container 1 since this is automatically taken into consideration by the calculator 7 through the time period provided between two signals of the signalling devices 5 and 6. It is important, however, that this super pressure should remain constant during a flow transmitting operation. However, by selecting a sufficiently high pressure the effect of pressure variations can be kept small.

By way of example, let it be assumed that the liquid front requires 0.5 sec. to move from the signalling device 5 to the signalling device 6, so that there is a time interval of 0.5 sec. between the two signals of the signalling devices 5 and 6, and that the liquid volume between the two signalling devices 5 and 6 amounts to 1 cm$^3$. If, for example, 1.8 cm$^3$ are to be transmitted, then the calculator 7 sends a signal after a time period of 0.9 sec. after receiving the signal of the signalling device 6, to the closure device 8 for clamping the pipe 4. It has been assumed that after the clamping, the part of the pipe extending beyond the clamps 9 in the flow direction remains filled with liquid. Obviously, this pipe must be emptied prior to the beginning of a new liquid transmission. This emptying can take place, for example, by producing under pressure in container 1 through the line 3, so that when the clamp 9 is opened, liquid will be sucked out of the conduit 4 into the container 1. Thus the viscosity of the liquid is not concerned with the dosing precision.

Within the framework of the present invention it is not necessary that the cover 12 should close the container 1 completely pressure tightly. The covering must be only sufficient to enable pressure within the container 1 to press the liquid through the pipe 4 toward the container 2. Compressed air is preferably used as the pressure means.

The described device of the present invention is particularly suitable for transmitting samples of a liquid of a human body from a general sampling container into different individual sampling containers. The general sampling container corresponds to the container 1 of the drawing while the container 2 is an individual sampling container. The total sample is then divided into a plurality of partial samples for examining the body liquid concerning its content of certain component parts, whereby the amount of a certain substance is determined from a specific individual sampling container. When the device of the present invention is used for that purpose it is important that the measuring results should not be falsified by mixing a liquid coming from one patient with remains of another liquid contained in pipe 4 and belonging to another patient, which was earlier transmitted from one container to the other. Such mixing would obviously produce incorrect results. Due to the use of a clamping device for clamping the pipe 4 its inner walls can be made completely smooth. Thus the pipe does not have inner projecting sharp edges, so that the danger that one sample will get mixed with another sample is quite small.

The described device of the present invention is suitable for indicating impediments in the blood flow which take place, for example, when blood is being transmitted and a blood coagulum clogs the pipe 4. In that case the disturbance causes a break off prior to the end of the time period corresponding to the set liquid volume, namely the break takes place at the signalling device 6. The calculator 7 forms out of the produced signal of the signalling device 6 a disturbance signal which is supplied to a disturbance indicator 11 for indicating the disturbance.

In accordance with the present invention the optical signalling devices 5 and 6 can be replaced by capacitive or inductive signalling devices.

What is claimed is:

1. A device for transmitting predetermined volumes of liquid, comprising a first container adapted to contain a liquid, means sealing said container, means supplying constant pressure into the interior of said container, a second container, a pipe having one end extending into the first container and an opposite end extending toward the second container for the flow of a liquid from the first container to the second container, two spaced signalling devices for determining the passage of the liquid front located in the path of liquid flowing through said pipe, a calculator connected with said signalling devices and receiving their signals, a setting device for a desired amount of liquid connected with the calculator, said calculator determining from said signals the volume of liquid passing through said pipe per time unit, and means connected with said calculator for closing said pipe when the time runs out during which the liquid volume set by the setting device has been transmitted.

2. A device in accordance with claim 1, wherein said pipe is an elastic hose and wherein said pipe closing means are clamps.

3. A device in accordance with claim 1, wherein the signalling device which is last in the direction of the flow of the liquid is located upon said opposite end of the pipe facing the second container.

4. A device in accordance with claim 1, comprising a disturbance indicator connected with said calculator, said calculator forming a disturbance signal from the first-mentioned signals when the flow of liquid in said pipe is interrupted prior to the expiration of the set time required for the flow of the desired amount of liquid.

* * * * *